E. JACOBS.
METALLIC PLATE JOINT.
No. 27,222.  Patented Feb. 21, 1860.
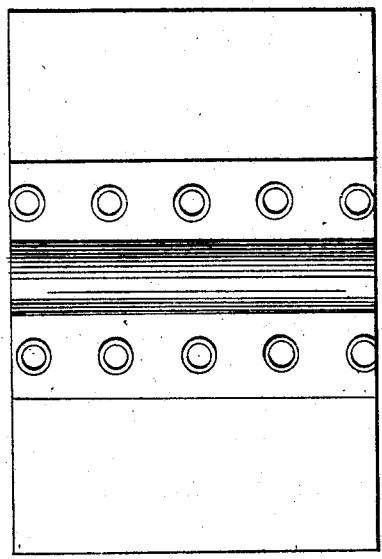
Witnesses
A. E. Gale
E. G. Gale
Inventor
Enoch Jacobs
pr L. D. Gale
his attorney

UNITED STATES PATENT OFFICE.

ENOCH JACOBS, OF CINCINNATI, OHIO.

JOINING PLATES OF METAL.

Specification of Letters Patent No. 27,222, dated February 21, 1860.

*To all whom it may concern:*

Be it known that I, ENOCH JACOBS, of Cincinnati, in the county of Hamilton and State of Ohio, have invented a new and Improved Metallic-Plate Joint; and I do hereby declare that the following is a full and exact description thereof, reference being had to the accompanying drawings, of which—

The Figure 1, is a plan, and Fig. 2 a section.

The nature of the invention is manifest from the inspection of the drawings, in which—

A, represents the plates to be united, and B the splice plate; B′, the form of the splice plate when rolled into its proper shape.

C, C, represent the true form best adapted for the rivets to fasten the plates together.

The invention presented in this joint depends chiefly on the previous preparation of the splice plate. This plate, originally a plain plate, or bar, of iron, is put between grooved rollers and the middle portion of the bar rolled into the semicylindric form, while the flat or plain portion is left sufficiently wide to embrace the rivet holes; which to be most effective are countersunk to the depth of the plate. But the countersinking is not a necessary part of the construction, as the common plain rivets may be used for the same purpose.

The splice plate B′ is so rolled out that the shoulders formed at the commencement of the curved part when properly made are somewhat thickened which gives strength to the joint above that which would be furnished by a plain splice piece.

Another and still greater advantage of this joint construction is, the hollow semicircular space which it incloses is designed to be used in the construction of buildings for several useful purposes as for conveying air, or water or both. If the joint be used by itself it forms a good covered way for the conveyance of sound from one part of a building to another, as giving orders to servants and directions to employees. It also may be employed for guarding water pipes through the building, for receiving fresh, or discharging waste, water—and for various other useful purposes, as air, water, and ventilation purposes. The utility of the device for the purpose of a speaking tube is valuable and highly practical. Indeed it is not only practicable to use the device for one of these purposes, but as the devices are repeated as many times as the plates themselves are repeated, consequently they are abundant for all the purposes referred to at the same and in the same structure.

This joint is specially applicable to the walls of houses designed for prisons, jails, or penitentiaries, where the tubular passage of the joint runs in the perpendicular direction and is specially fitted for the purposes already stated.

Having now fully described my method of constructing the joints of metallic plates and shown the advantages and the method of using the same, I proceed to state what I regard as the spirit of the invention and what I wish to claim.

What I claim as my invention and desire to secure by Letters Patent is—

The construction of the joint made by means of the closely abutting plates A, A, and the flat and semicylindrical plate B, B′, and rivets (C, C,) substantially in the manner and for the purpose set forth.

ENOCH JACOBS.

Witnesses:
   JAS. DAVIS,
   D. ADAMS.